(12) United States Patent  
Son

(10) Patent No.: US 7,596,943 B2  
(45) Date of Patent: Oct. 6, 2009

(54) METHOD FOR REMOVING SOOT OF COMBUSTION EXHAUST GAS

(75) Inventor: Geon Seog Son, Seongnam-Si (KR)

(73) Assignee: Ordeg Co., Ltd. (KR)

( * ) Notice: Subject to any disclaimer, the term of this patent is extended or adjusted under 35 U.S.C. 154(b) by 625 days.

(21) Appl. No.: 11/120,558

(22) Filed: May 3, 2005

(65) Prior Publication Data

US 2006/0051273 A1 Mar. 9, 2006

Related U.S. Application Data

(63) Continuation of application No. PCT/KR2005/000296, filed on Feb. 1, 2005.

(30) Foreign Application Priority Data

Sep. 7, 2004 (KR) .................. 10-2004-0071277

(51) Int. Cl.
- *F01N 3/10* (2006.01)
- *F01N 3/00* (2006.01)
- *F01N 3/02* (2006.01)
- *B01D 50/00* (2006.01)
- *B01D 53/34* (2006.01)
- *B01J 19/08* (2006.01)
- *B01J 19/12* (2006.01)

(52) U.S. Cl. .............. 60/299; 60/274; 60/275; 60/297; 60/311; 422/168; 422/186.04; 422/186.1; 422/186.3

(58) Field of Classification Search .......... 60/295, 60/274, 275, 297, 299, 311; 422/168, 186.04, 422/186.1, 186.3

See application file for complete search history.

(56) References Cited

U.S. PATENT DOCUMENTS 5,266,102 A  11/1993  Gaffney et al.

(Continued)

FOREIGN PATENT DOCUMENTS

JP  61-164014  7/1986

(Continued)

*Primary Examiner*—Jerry Lorengo  
*Assistant Examiner*—Kevin M Johnson  
(74) *Attorney, Agent, or Firm*—Knobbe Martens Olson & Bear LLP

(57) ABSTRACT

Disclosed is a method of processing a composition comprising soot. The method includes supplying a first composition comprising soot particles to a first chamber. The first chamber is separated from a second chamber with a filter wall located therebetween. The soot particles are collected with the filter wall in the first chamber while substantially passing gaseous components of the first composition to the second chamber. A photocatalyst configured to facilitate generating at least one oxidant is activated, and the at least one oxidant oxidizes at least part of the soot filtered in the first chamber. Further disclosed is a soot processing apparatus, which includes a first electrode, a second electrode opposing to the first electrode, a first cell, a second cell and at least one porous wall. The first and second electrodes create a plasma state between them. The first cell and second cell are located between the first and second electrodes, and each has an opening. The first cell receives through the inlet opening a supply of a first composition comprising soot particles. The second cell exhausts through the outlet opening a second composition substantially free of soot particles. The porous wall partitions the first cell from the second cell and collects soot particles in the first cell while passing gaseous molecules of the first composition to the second cell.

16 Claims, 8 Drawing Sheets

U.S. PATENT DOCUMENTS

| | | | |
|---|---|---|---|
| 5,440,876 A | 8/1995 | Bayliss et al. | |
| 5,557,923 A | 9/1996 | Bolt et al. | |
| 5,651,248 A | 7/1997 | Kawamura | |
| 5,679,134 A | 10/1997 | Brugerolle et al. | |
| 5,785,740 A | 7/1998 | Brugerolle et al. | |
| 5,807,526 A | 9/1998 | Miljevic | |
| 6,185,930 B1 | 2/2001 | Lepperhoff et al. | |
| 6,210,641 B1 | 4/2001 | Yamada et al. | |
| 6,321,531 B1 | 11/2001 | Caren et al. | |
| 6,340,382 B1 | 1/2002 | Baksh et al. | |
| 6,406,520 B1 | 6/2002 | Lledo | |
| 6,475,350 B2 | 11/2002 | Palekar et al. | |
| 7,442,218 B2 * | 10/2008 | Okubo et al. | 55/282.3 |
| 2001/0043890 A1 * | 11/2001 | Son | 422/174 |
| 2003/0182930 A1 * | 10/2003 | Goulette et al. | 60/275 |

FOREIGN PATENT DOCUMENTS

| | | |
|---|---|---|
| JP | 05-272326 | 10/1993 |
| JP | 2000350908 A * | 12/2000 |
| WO | WO 2004/013469 A1 * | 2/2004 |

* cited by examiner (a)

(b)

METHOD FOR REMOVING SOOT OF COMBUSTION EXHAUST GAS

CROSS-REFERENCE TO RELATED APPLICATIONS

This application is a continuation under 35 U.S.C. § 365 (c) of International Application No. PCT/KR2005/000296 filed Feb. 1, 2005, designating the United States and claiming for the benefit of the earlier filing dates under 35 U.S.C. § 365 (b) of Korean Patent Application Nos. 10-2004-0071277 filed Sep. 7, 2004. International Application No. PCT/KR2005/000296 has not been published as of the filing date.

Further, this application is related to U.S. patent application Ser. No. 11/120,559, filed concurrently herewith and entitled "System for Removing Soot of Combustion Exhaust Gas," which is hereby incorporated by reference herein.

BACKGROUND OF THE INVENTION

1. Field of the Invention

The invention relates to removing soot from exhaust gas of a combustion engine, more particularly from diesel exhaust gas.

2. Description of the Related Art

Generally, exhaust gas processing systems for diesel engines are comprised of a diesel oxidation catalyst (DOC), a diesel particulate matter filter (DPF), and a NOx converter. As for DOC, only an oxidation function of existing three-way catalysts is enhanced and poison resistance is increased. Since the DOC is technically reasonable, it has been mounted on diesel vehicles. However, the DOC has disadvantages in that in case of fuel with a great deal of sulfur as a component thereof, a large amount of particulate matters with sizes of 100 nm or less, which are harmful to human respiratory organs, are discharged at a rear end of the DOC, and the catalyst is poisoned by the sulfur component, resulting in degraded durability.

Table 1 below summarizes existing techniques for processing particulate matters.

TABLE 1

Techniques for processing particulate matter of diesel exhaust gas

| Manufacturer | Product Name | Technique | Performance and Features |
|---|---|---|---|
| Johnson-Matthey | CRT | Oxidation catalyst + Ceramic filter Continuous regeneration type Applicable to large diesel engines | About 8,770 products on test Reduction of PM, CO and HC to a level of 90% Reduction of NOx by about 3~8% Reduction of particles of 10~250 nm among PM Low poison resistance against sulfur is a critical obstacle to practicability. |
| Engelhard | DPX | Oxidation catalyst + Ceramic filter Continuous regeneration type | About 5,000 products are mounted. (Europe/North America/Taiwan) Reduction of PM, CO and HC by 70~90%, 80% and 80%, respectively. Confirmed durability of 20,000 hrs. Fuel with 350 ppm of sulfur is usable. |
| Ibiden | SiC-DFP | Silicone carbide filter Additive, Catalyst, Electrical heater | 7,300 products in use in Europe Cerium-based Eolys Additive from Rhodia Heat is generated due to combustion of unburned hydrocarbon by a front oxidation catalyst. Discharge by multiple fuel injection every period of 400~500 km Forcible regeneration due to raised gas temperature Ash deposited in the filter is washed with water every 80,000 km. |

As shown in Table 1, CRT (Continuously Regenerating Trap or Technologies) developed by Johnson-Matthey Plc. and DPX (Diesel Particulate Filter) developed by Engelhard Corporation comprise a suction part, a catalyst part, a filtering part and an exhaust part. In theses apparatuses, the filtering unit is DPF 101 employing a ceramic honeycomb monolith filter, and a diesel oxidation catalyst (DOC) 102 that is the catalyst part using noble metal is placed in front of the DPF 101 for capturing particulate matters contained in diesel exhaust gas flowing thereinto so as to react abundant oxygen and nitrogen oxides existing in the exhaust gas with each other, thereby producing nitrogen dioxide with superior oxidizing power, and oxidizing and removing the particulate matters captured by the DPF 101.

As for the principle that such type of DPF 101 captures the particulate matters, as shown in FIG. 2, exhaust gas flows into the DPF 101 through unit cells 103 with open upstream ends at an inlet of the filter, and downstream ends of the unit cells 103 with the open upstream ends are blocked by plugging 104 made of the same material as the filter, so that gaseous components of the exhaust gas pass through porous walls 105 into adjacent unit cells 106 with closed upstream ends and particulate matters which are solid components cannot pass through pores in the walls and thus are captured.

Meanwhile, if nitrogen dioxide ($NO_2$) is sufficiently generated in the exhaust gas, CRT would have superior removal performance for the particulate matters 107. However, the generation of nitrogen dioxide is very sensitive to the temperature of the exhaust gas. That is, if the temperature of the exhaust gas is low, a noble metal catalyst may not be activated and thus nitric monoxide (NO) is not caused to react with oxygen, resulting in rapid reduction in a generation rate of nitrogen dioxide. Further, there is a disadvantage in that the noble metal catalyst is poisoned by sulfur component existing in diesel exhaust gas, resulting rapid degradation in its performance.

Moreover, as shown in FIG. 3, there has been developed a method of regenerating the DPF 101 through oxidation of nitric monoxide into nitrogen dioxide regardless of the temperature of exhaust gas and sulfur component by installing a plasma generator 111 in front of the DPF 101 to use strong oxidizing power of plasma, based on the same regeneration concept as described above. However, since such a method employing only plasma as a regeneration means requires a large amount of electric power to generate plasma, the method cannot be used in view of the capacity of a current battery 112. An inverter 113 for generation of plasma is expensive and has a large size.

In addition, as shown in FIG. 4, SiC-DPF developed by Ibiden Co., Ltd. is manufactured by changing cordierite ceramic used as the material of a conventional DPF into silicone carbide with superior mechanical strength, and is improved in that intermediate layers can be coated through increase in the porosity of walls of unit cells of the filter.

Therefore, there is a method of forcibly burning captured particulate matters using a heating means 121 such as a hot wire positioned in front of the DPF 101. However, this method has a problem in that since electric power consumption is very high in raising the temperature of exhaust gas containing a large amount of moisture up to 350° C. or higher that is a forcible combustion temperature for particulate matters, it is difficult to commercially implement the method using current batteries for diesel vehicles.

In addition to the aforementioned techniques for removing particulate matter or soot of diesel exhaust gas, there has been developed a method of adding an additive to fuel, wherein Ce or Fe is added as a catalyst to the fuel on the order of ppm. This method has advantages in that the metal catalyst contained in the fuel lowers the regeneration temperature of the DPF upon regeneration of the DPF and shortens a regeneration period of time. However, this method has disadvantages in that since the catalyst is metal, it increases back pressure of the DPF in cooperation with ash of engine oil and shortens the period of exchange of the DPF.

Meanwhile, as shown in FIG. 5, there is a system for processing exhaust gas using a photoreaction, which has been developed as an apparatus for removing harmful substances contained in exhaust gas of an internal combustion engine but does not reside in techniques for removing particulate matters contained in diesel exhaust gas as described above. This system has an advantage in that it can be operated with low electric power regardless of the temperature, air-fuel ratio and sulfur component of exhaust gas.

In the aforementioned system, contrary to the DPF for removing particulate matters contained in exhaust gas, a honeycomb monolith carrier 30 including unit cells 34 each of which is open at both ends thereof is coated with a photocatalyst and high voltage is applied to the both ends using electrodes 40 formed of metal nets or plates so that plasma can be generated within the unit cells 34 of the honeycomb monolith carrier 30, thereby exciting the photocatalyst and effectively reducing gas-phase harmful components existing in exhaust gas.

Although the conventional exhaust gas processing system using the photoreaction described above is effective for removal of gas-phase harmful components on the basis of strong oxidizing power and reducing power, the system has a problem in that since it takes more time for solid-phase components such as particulate matters contained in diesel exhaust gas to be oxidized as compared with gas-phase components, the solid-phase particulate matters cannot be sufficiently oxidized while passing though the unit cells with the open ends, and thus, it is impossible to remove the particulate matters.

Japanese Patent Laid-Open Publication Nos. (Sho)61-164014, (Hei)5-272326 etc. disclose apparatuses for processing diesel exhaust gas, wherein both ends of cells of a honeycomb monolith carrier are alternately plugged, the disclosures of which are considered to be a part herein.

SUMMARY OF THE INVENTION

An aspect of the invention provides a method of processing a composition comprising soot particles. The method comprise: supplying a first composition comprising soot particles and at least one gaseous component to a first chamber comprising a filter wall; collecting with the filter wall the soot particles in the first chamber while passing the at least one gaseous component through the filter wall to a second chamber; activating a photocatalyst and generating at least one oxidant; and oxidizing at least part of the soot particles collected in the first chamber with the at least one oxidant.

In the foregoing method, collecting, activating and oxidizing may be substantially simultaneously carried out, and collecting, activating and oxidizing may be substantially sequentially carried out. The method may further comprise discharging from the second chamber a second composition substantially free of soot particles. The photocatalyst may be located in at least one of the first and second chambers. The photocatalyst may be formed on a surface of the filter wall. Activating the photocatalyst may comprise creating a plasma condition in at least one of the first and second chambers. The first composition may comprise an exhaust gas from combustion of fuel comprising hydrocarbons. The soot particles may comprise hydrocarbons that may not pass through the filter wall, wherein oxidizing at least part of the soot particles may comprise oxidizing some or all of the hydrocarbons, which may be broken into smaller molecules that can pass through the filter wall. The at least one oxidant may comprise superoxide anion and/or hydroxyl radical. Oxidizing at least part of the soot particles may comprise converting at least part of the soot particles to gas.

Another aspect of the invention provides a system comprising a combustor and a soot processing apparatus. The combustor is configured to discharge a composition comprises soot particles, and the soot processing apparatus is configured to remove at least part of the soot particles by the above-described method. The system may comprise a motor vehicle.

Another aspect of the invention provides a method of processing a composition comprising soot. The method comprises: filtering a first composition comprising soot particles and gaseous components with a filter, which passes the gaseous components therethrough while inhibiting soot particles from passing, thereby depositing at least part of the soot particles on a surface of the filter. The method further comprises creating a plasma condition near the filter and removing at least part of the soot particles deposited on the filter. The plasma condition activates a catalyst formed on the filter. The catalyst generates one or more oxidants by reacting with ambient chemical species.

In the foregoing method, removing at least part of the soot particles may comprise oxidizing the at least part of the soot particles with the one or more oxidants and converting the at least part of the soot particles to gas. The filter may be made of a porous ceramic material. The catalyst may be selected from the group consisting of $TiO_2$, ZnO, CdS, $ZrO_2$, $SnO_2$, $V_2O_2$, $WO_3$, $SrTiO_3$, and a mixture comprising one or more of the foregoing compounds. Filtering, creating and removing may be substantially simultaneously carried out. Oxidizing the at least part of the soot particles may generate resultants that can pass through the filter. The ambient chemical species may comprise one or more selected from the group consisting of the at least one gaseous components of the first composition and components of the air.

Still another aspect of the invention provides a soot processing apparatus. The apparatus comprises: a first electrode;

a second electrode opposing to the first electrode; a first cell located between the first and second electrodes; a second cell located between the first and second electrodes; and at least one porous wall located between the first and second cells. The first and second electrodes are configured to create a plasma state therebetween. The first cell has an inlet opening on the side of the first electrode and is configured to receive a supply of a first composition through the inlet opening. The first composition comprises soot particles and gaseous components. The second cell has an outlet opening on the side of the second electrode. The second cell is configured to exhaust a second composition through the outlet opening. The at least one porous wall is configured pass the gaseous components therethrough while substantially blocking the soot particles.

The foregoing apparatus may further comprise a catalyst formed on a surface of the at least one porous wall. The catalyst may be configured to be activated by a plasma state and to generate an oxidant by a reaction with one or more ambient chemical species. The catalyst may be selected from the group consisting of $TiO_2$, $ZnO$, $CdS$, $ZrO_2$, $SnO_2$, $V_2O_2$, $WO_3$, $SrTiO_3$, and a mixture comprising one or more of the foregoing compounds. The first wall may be elongated in a direction substantially perpendicular to at least one of the first and second electrodes. The inlet opening may be formed through the first electrode. An end of the first cell on the side of the second electrode may be blocked by the second electrode. The first cell may have no outlet opening on the side of the second electrode. The second cell may have no inlet opening on the side of the first electrode. The at least one porous wall may comprise a partitioning wall partitioning between the first and second cells.

Still another aspect of the invention provides an automobile comprising the above-described apparatus.

A further aspect of the invention provides a soot processing apparatus. The apparatus comprises: a first electrode; a second electrode opposing to the first electrode, a filter partitioning a space between the first electrode and the second electrode into a first chamber and a second chamber; the first chamber having an opening through the first electrode; and the second chamber having an opening through the second electrode. The first and second electrodes are configured to create a plasma condition therebetween. The first chamber and second chamber are in fluid communication through the filter while the filter substantially inhibits passage of soot particles therethrough.

The above-described apparatus may further comprise a catalyst formed on the filter. The catalyst may be configured to be activated by a plasma state and to generate an oxidant by a reaction with one or more ambient chemical species. The apparatus may further comprise a plurality of filters, each filter partitioning a space between the first and second electrodes into another first chamber and another second chamber. The opening of the first chamber may be in fluid communication with a supply of a combustion exhaust. The filter may extend substantially throughout between the first and second electrodes. The first and second chambers may extend substantially throughout between the first and second electrodes. The apparatus may further comprise an internal combustion engine. The internal combustion engine may comprise a diesel engine. The inlet opening of the first cell may be in fluid communication with an exhaust passage of the internal combustion engine.

A still further aspect of the invention provides a soot processing apparatus. The apparatus comprises: means for filtering a first composition comprising soot particles and gaseous particles and for collecting the soot particles in a chamber while passing the gaseous particles out of the chamber; means for creating a plasma condition in the chamber; and means for generating one or more oxidants in the contained area upon creating the plasma condition in the chamber. The means for filtering and collecting may comprise a filter made of a substantially non-conductive material. The means for filtering and collecting may comprise a single filter defining the chamber. The means for filtering and collecting may comprise a filter structure comprising a plurality of filter walls defining the chamber and a plurality of substantially isolated spaces.

A further aspect of the invention provides an apparatus for processing diesel exhaust gas, including a filter for filtering the diesel exhaust gas and an electrode device for regenerating the filter by removing captured particulate matters. The apparatus comprises a porous filter with an inner surface coated with a photocatalyst, for capturing the particulate matters by filtering the diesel exhaust gas; conductive metal for alternately plugging inlets and outlets of respective unit cells of the porous filter; and metal layers coated on both end surfaces of the porous filter plugged by the conductive metal. The carrier is contained within a case formed with a power supply terminal. Accordingly, the apparatus has the coated inner photocatalyst layer and the integral electrodes.

Further, in the apparatus of the present invention, thermal expansion properties of the conductive metal for plugging the porous filter and the metal layers coated on the both end surfaces of the porous filter may be similar to those of the porous filter. Moreover, when the porous filter is contained within the case, both ends of the carrier may be fixed by insulators and side portions thereof may be supported by shock-absorbing mats for performing a shock-absorbing function with respect to the case.

A further aspect of the invention provides a method of manufacturing an apparatus for processing diesel exhaust gas, including a filter for filtering the diesel exhaust gas and an electrode device for regenerating the filter by removing captured particulate matters. The method comprises the steps of coating an inner surface of a porous filter with a photocatalyst; alternately blocking inlets and outlets of respective unit cells of the porous filter with the inner surface coated with the photocatalyst by means of plugging conductive metal; coating both end surfaces of the porous filter plugged by the conductive metal with conductive metal; heat-treating the porous filter; and causing the heat-treated porous filter to be contained in a case formed with a power supply terminal, whereby the apparatus has the coated inner photocatalyst layer and the integral electrodes.

Further, in the steps of plugging the porous filter by the conductive metal and coating the both end surfaces of the porous filter plugged by the conductive metal with the conductive metal, the plugging and coating may be performed by selecting a metal with a thermal expansion property similar to that of the porous filter. Moreover, in the step of causing the porous filter to be contained in the case, both ends of the porous filter may be fixed within an inner space of the case by means of insulators, and side portions of the porous filter may be supported by means of shock-absorbing mats to absorb impact with respect to an inner wall of the case.

Figure 1:
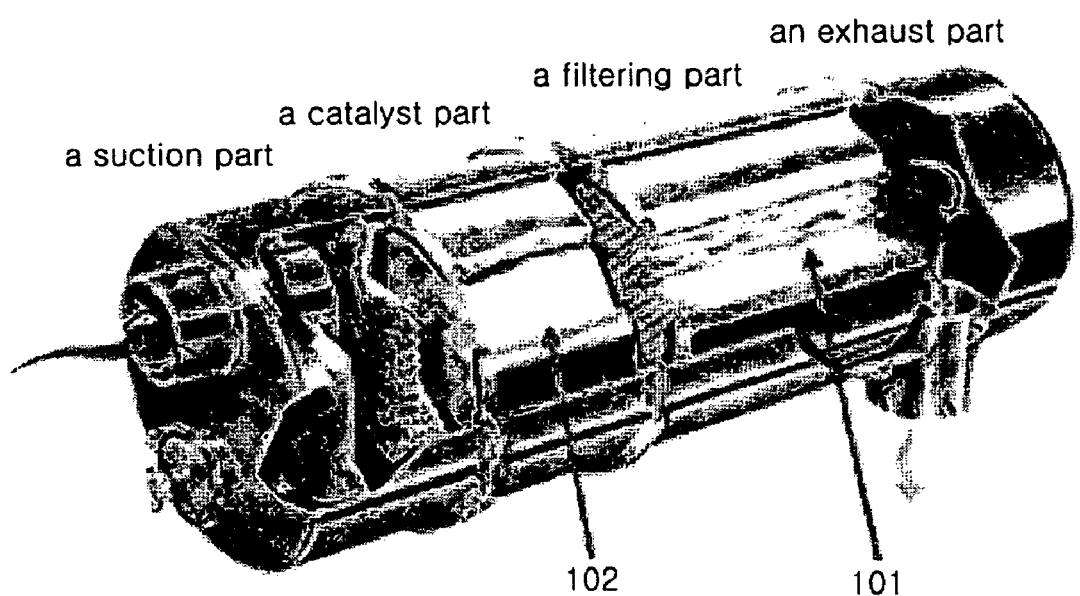
FIG. 1 is a schematic view showing a conventional CRT reactor available from Johnson-Matthey Plc.
Figure 2:
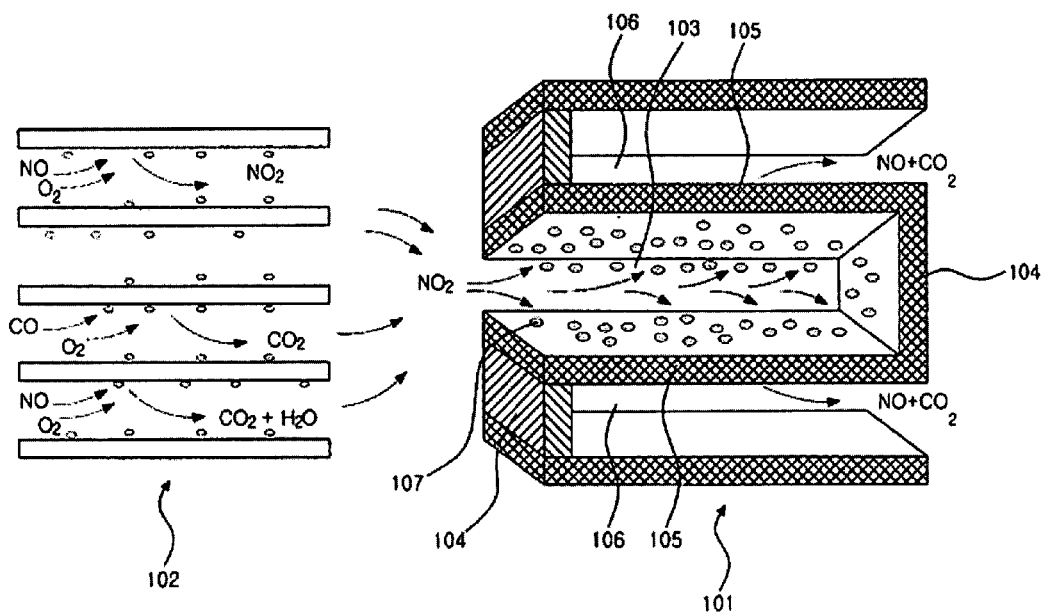
FIG. 2 is a view illustrating gas streams in a DPF system of the conventional CRT reactor available from Johnson-Matthey Plc.

<Explanation of Reference Numerals for Designating Main Components in the Drawings>

| 101: | DPF | 102: | Diesel oxidation catalyst (DOC) |
|---|---|---|---|
| 111: | Plasma generator | 112: | Battery |
| 113: | Inverter for plasma generation | 121: | Heating means |
| 203: | Photocatalyst material | 204: | Plugging conductive metal |
| 205: | Coated metal layer | 207a, 207b: | Unit cell |
| 208: | Porous filter | 209: | Shock-absorbing mat |
| 210: | Case | 211: | Exhaust portion |
| 212: | Inflow portion | 214: | Power supplying terminal |

DETAILED DESCRIPTION OF EMBODIMENTS

Figure 6:
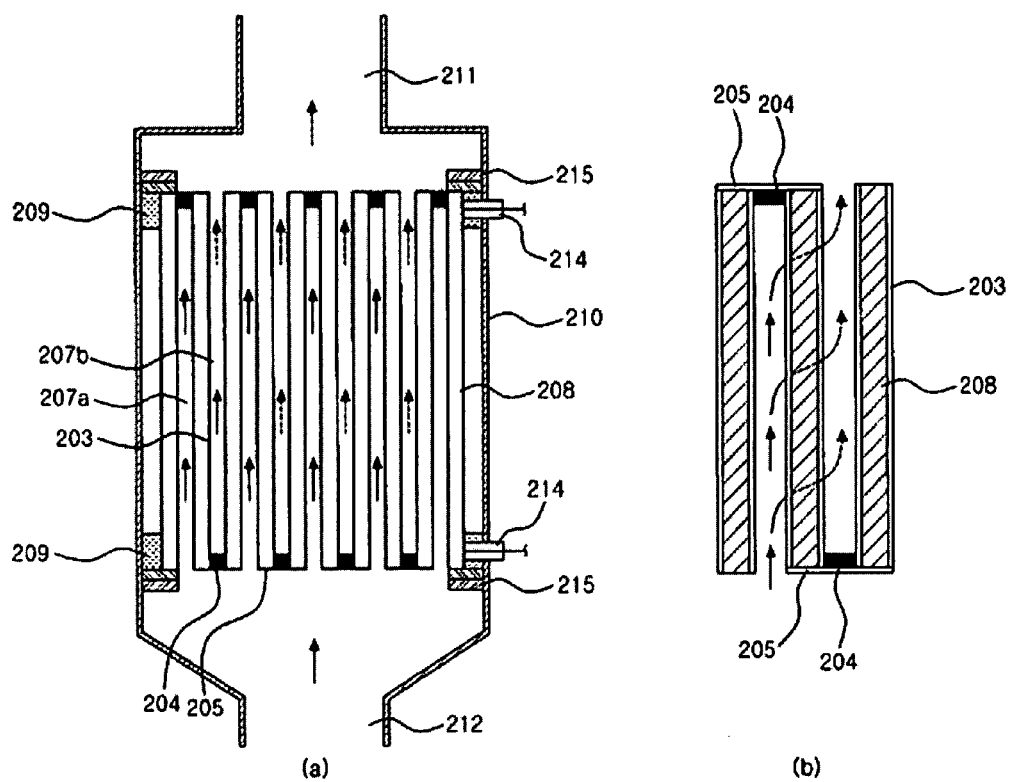
FIG. 6 is a sectional view showing the entire configuration of an apparatus for processing diesel exhaust gas with a coated inner photocatalyst layer and integral electrodes according to an embodiment of the invention.
Figure 7:
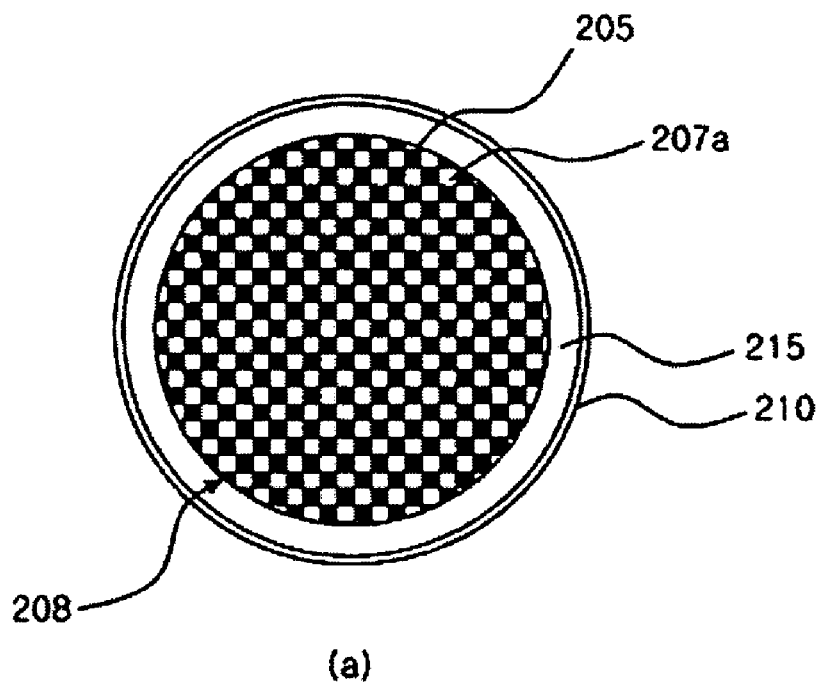
FIG. 7 shows a sectional view and an enlarged view of a porous honeycomb monolith carrier of the apparatus for processing diesel exhaust gas with the coated inner photocatalyst layer and the integral electrodes according to an embodiment the invention.
Figure 7:
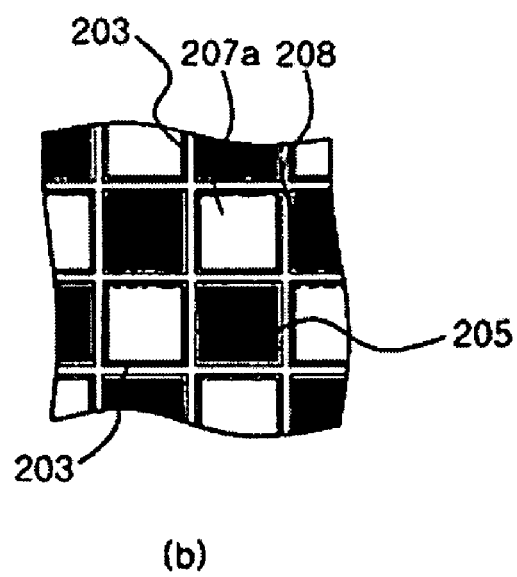

FIG. 6 is a cross-sectional view of an embodiment of an apparatus for processing diesel exhaust gas with a coated inner photocatalyst layer and integral electrodes according to an embodiment of the invention. FIG. 7 shows a sectional view and an enlarged view of a porous filter of the apparatus for processing diesel exhaust gas with the coated inner photocatalyst layer and the integral electrodes according to an embodiment of the invention. The coating of the photocatalyst on a surface of the porous filter may not be continuous. The photocatalyst layer does not prevent gaseous components from contacting the porous filter.

The specific configuration and operation of an embodiment of the invention will be described in connection with a preferred embodiment with reference to the accompanying drawings. However, the embodiment of an embodiment of the invention is only for illustrative purposes and does not limit the scope of the invention.

As shown in FIG. 6, the apparatus for processing diesel exhaust gas according to an embodiment of the invention is constructed in such a manner that a porous filter 208 is contained within a hollow case 210 made of a metal material.

The porous filter 208 takes the shape of a cylinder comprised of a plurality of unit cells 207a and 207b that are formed through extrusion of general ceramic. Although the unit cells 207a and 207b may have a variety of sectional shapes such as a triangle, a rectangle, a pentagon, a hexagon and a circle, an embodiment of the invention will be described herein in connection with an embodiment in which the sectional shapes of the unit cells 207a and 207b are a rectangle.

As described above, the porous filter 208 of an embodiment of the invention is an integral assembly of the unit cells 207a and 207b each of which has a rectangular sectional shape and is open at both ends thereof.

An inner surface of the porous filter 208 is coated with a photocatalyst material 203 activated by a light source. The coating process employs a typical process of dipping the porous filter 208 into a solution with the photocatalyst material 203 dissolved therein.

Further, the photocatalyst material coated on the inner surface of the porous filter 208 can be selected from the group consisting of $TiO_2$, $ZnO$, $CdS$, $ZrO_2$, $SnO_2$, $V_2O_2$, $WO_3$, $SrTiO_3$, and a mixture comprising one or more of the foregoing compounds, although not limited thereto. The embodiment of an embodiment of the invention is described with $TiO_2$. The photocatalyst effects are excited by light with a certain wavelength, which is well appreciated by one of ordinary skill in the art. In this process, when the light with a certain wavelength is irradiated onto the photocatalyst material, $TiO_2$, electrons $e^-$ and holes $h^+$ are generated and react with $O_2$ and/or $H_2$ of the air to generate reactive oxygen, including superoxide anion $O_2^-$ and hydroxyl radical —OH or $OH^-$, on the surface of $TiO_2$, thereby causing reactions by which harmful substances are decomposed due to strong oxidation or reduction actions.

After the inner surface of the respective unit cells 207a and 207b of the porous filter 208 is coated with the photocatalyst material 203 in accordance with the aforementioned principle, upstream and downstream portions of the unit cells 207a and 207b of the carrier 208 are alternately plugged using conductive metal (powder) 204 that has superior electrical conductivity and thermal stability.

That is, the alternate plugging of the upstream and downstream portions of the unit cells 207a and 207b means that if the upstream portion of one of the unit cells 207a or 207b is plugged by the conductive metal 204 to shut off the inflow gas, a portion of the unit cell opposite thereto is not plugged but open, and that if the upstream portion of one of the unit cells 207a or 207b is open to allow the introduction of the inflow gas, the portion of the unit cell opposite thereto is plugged by the conductive metal 204, as shown in FIG. 6 (b).

Further, as shown in FIG. 7, one of the unit cells 207a or 207b and adjacent unit cells 207b or 207a of the porous filter 208 of an embodiment of the invention are alternately plugged. That is, if any one of the unit cells 207a or 207b is plugged, four unit cells 207b or 207a adjacent to the plugged unit cell are not plugged.

As for the conductive metal 204 that is a plugging material, metal or alloy powder with thermal properties, such as a thermal expansion coefficient, similar to those of the porous filter 208 is used, thereby preventing damage to the filter 208 due to difference in thermal expansion resulting from enormous oxidation heat that is produced during a granular powder-regenerating process. Examples of the plugging material include a combination of stainless steel, aluminum (Al), titanium (Ti), molybdenum (Mo), Copper (Cu), iron oxide ($FeO_2$) and the like at a proper ratio. The combination and the ratio thereof may be changed to be suitable to thermal properties of the filter 208 made of ceramic.

When the plugging process for the porous filter 208 is completed in such a manner, both end surfaces of the porous filter 208 are coated with the same metal (alloy) as the material of the plugging to form metal layers 205.

It is preferred that such powder coating processing be performed using metal (alloy) powder. In this case, a volatile solvent is added to and mixed with metal powder, and the mixture is then coated on the both end surfaces of the porous filter 208 and subjected to heat treatment so that the conductive metal 204 for plugging the respective unit cells 207a and 207b and the metal layers 205 coated on the both end surfaces can be strongly bonded mutually to the filter 208 and the metal (powder).

That is, the plugging metal 204 and the coated metal layer 205 are sintered through the heat treatment at high temperature and electrically connected to each other so that they have an identical phase. Thus, they become a united single electrode when a high voltage is applied thereto.

Figure 5:
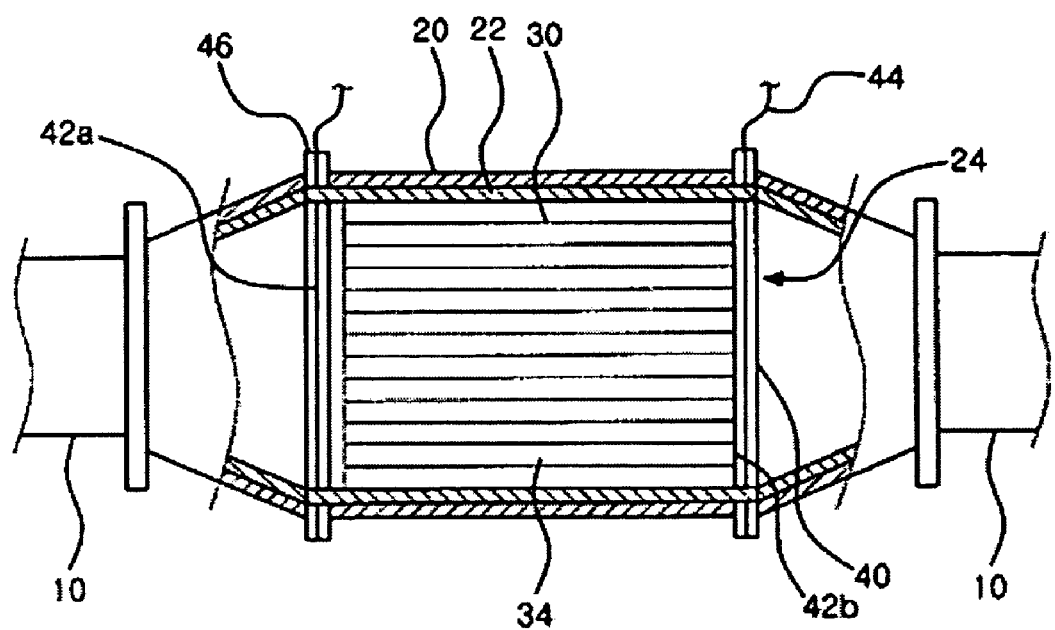
FIG. 5 is a schematic view showing a conventional photocatalyst reaction system.

Accordingly, each of the unit cells 207a and 207b of the porous filter 208, which was open at both ends thereof, has one end alternately blocked by the plugging metal 204, thereby capturing particulate matters contained in exhaust gas from a diesel engine. Further, since the metal layers 205 made of the same material as the plugging are coated and sintered on the both end surfaces of the filter 208, it is considered that the electrodes 40 (see FIG. 5) installed in the photoreaction system (see FIG. 5) have been replaced with structures having electrodes formed integrally with the carrier 208 in an embodiment of the invention.

Moreover, since the inner surfaces of the respective unit cells 207a and 207b of the porous filter 208 with the integral electrodes according to an embodiment of the invention are coated with the photocatalyst material 203, an oxidation reaction occurs within the porous filter 208.

The porous filter 208 of an embodiment of the invention constructed as above is contained within the hollow case 210 made of a metal material, as shown in FIG. 6. That is, the porous filter 208 of an embodiment of the invention is contained within the case in such a manner that the longitudinal direction of the unit cells 207a and 207b is coincident with a direction in which exhaust gas flows within the hollow case 210 formed with an inflow portion 212 and an exhaust portion 211 for the exhaust gas.

Carrier supports 215 are formed on an inner wall of the case 210 at an interval corresponding to the length of the porous filter 208 of an embodiment of the invention. The material of the carrier supports 215 comprises an insulation material that is electrically non-conductive, so that a current cannot flow toward the case 210 even when a current flows through the porous filter 208.

Moreover, shock-absorbing mats 209 are interposed between an outer wall of the porous filter 208 contained in the case 210 and the inner wall of the case 210 to perform a shock-absorbing function of protecting the porous filter 208 from an external impact. The shock-absorbing mats 209 are made of an insulative fibrous material such as asbestos or mica that can withstand high temperature.

Meanwhile, a power supply terminal 214 capable of supplying electrical power is provided on an outer surface of the case 210. That is, the power supply terminal 214 installed to penetrate through the case 210 is arranged to be electrically insulated from the case 210 and to be in electrical contact with the outer wall of the porous filter 208 contained in and fixed to the case 210.

Figure 3:
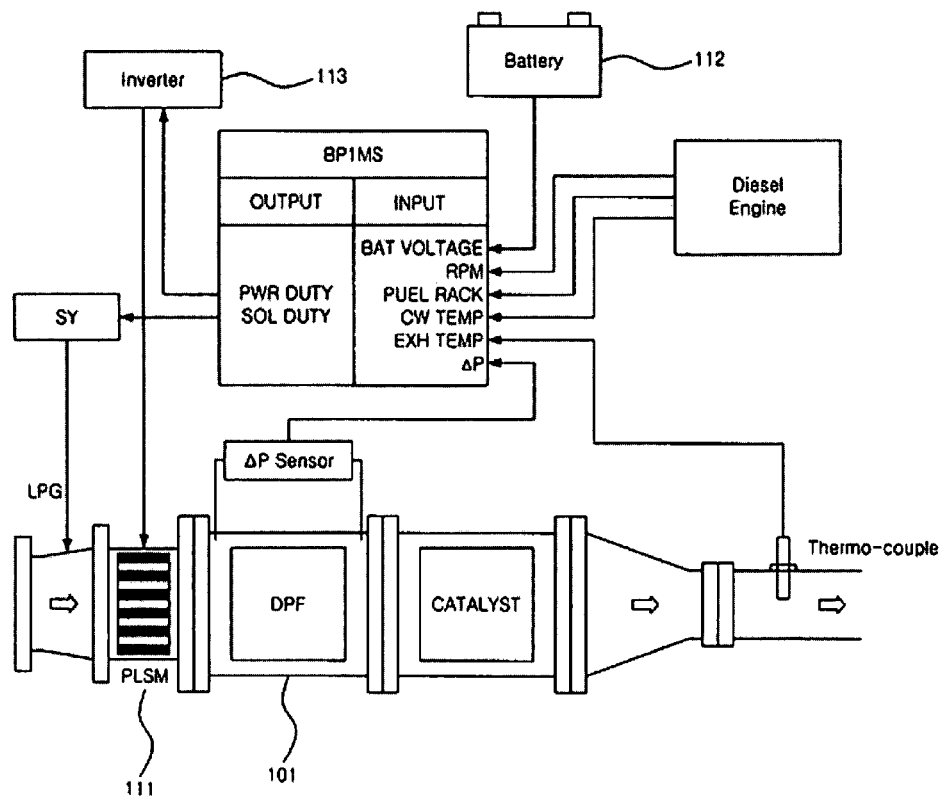
FIG. 3 is a schematic view showing a conventional DPF system employing a plasma generator.
Figure 4:
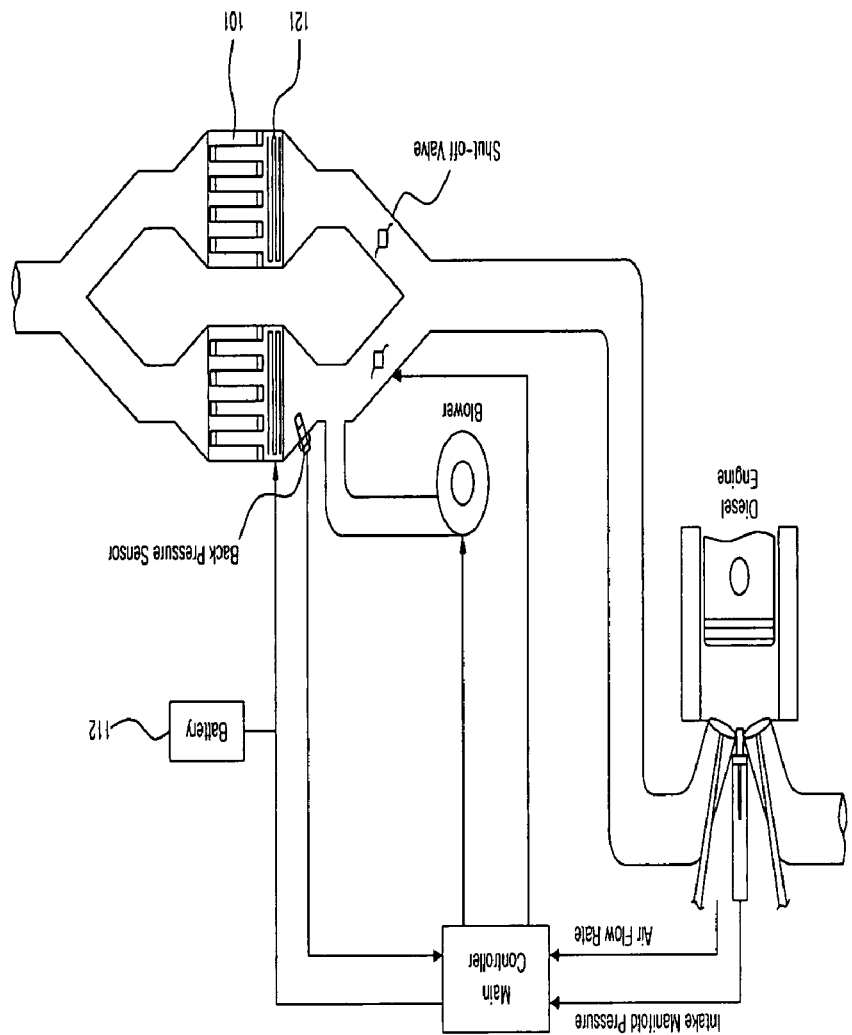
FIG. 4 is a schematic view showing a conventional DPF system employing a heating means.

The apparatus for processing diesel exhaust gas according to an embodiment of the invention constructed as above performs purification of the exhaust gas by substituting for the DPF 101, the plasma generator 111 and the heating means 121 of the system shown in FIGS. 3 and 4.

Now, the operation of an embodiment of the invention will be described.

Figure 8:
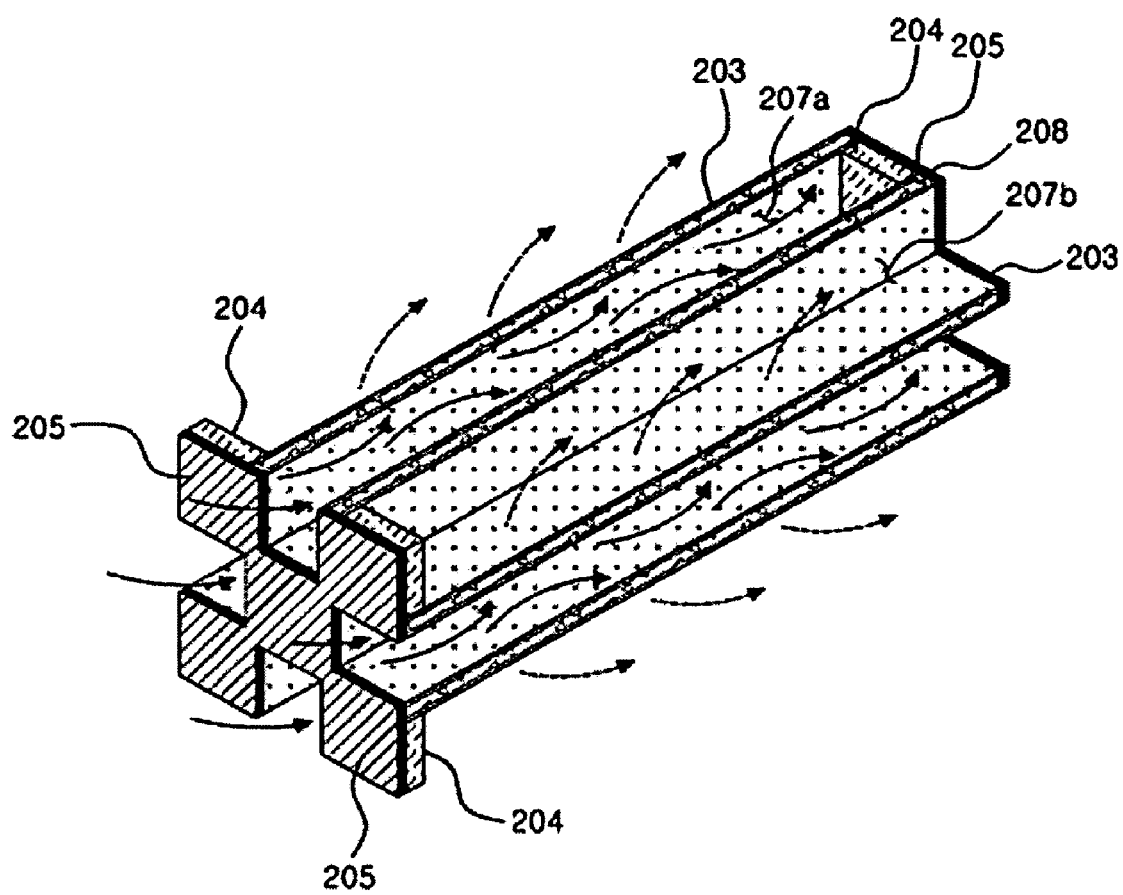
FIG. 8 shows an operation state of the porous honeycomb monolith carrier of the apparatus for processing diesel exhaust gas with the coated inner photocatalyst layer and the integral electrodes according to an embodiment the invention.

FIG. 8 shows an operation state of the porous filter of the apparatus for processing diesel exhaust gas with the coated inner photocatalyst layer and the integral electrodes according to an embodiment of the invention.

FIG. 8 is an enlarged partial view showing the operation of the porous filter 208 of the apparatus for processing diesel exhaust gas according to an embodiment of the invention. The diesel exhaust gas introduced (as designated by solid arrows) through the unit cell 207a with the upstream portion (inlet portion) that is not plugged by the conductive metal 204 enters the adjacent unit cells 207b while being filtered by the porous wall of the unit cell 207a and is exhausted therethrough (as designated by dotted arrows) since the downstream portion (outlet portion) of the unit cell 207a is plugged by the metal.

At this time, the porous filter 208 of an embodiment of the invention receives a high voltage from the power supply terminal 214 installed at the case 210 and generates plasma for the photocatalyst with low electric power to activate the photocatalyst. The oxidizing power of the activated photocatalyst is used to efficiently and consecutively remove particulate matters that have been filtered out and captured by the porous wall of the unit cell 207a.

Such a reaction for removing the particulate matters occurs all the unit cells 207a and 207b of the porous filter 208, thereby effectively removing the captured particulate matters.

According to an embodiment of the invention described above, a photocatalyst is coated on a porous filter and each of unit cells of the porous filter is alternately plugged at one of both ends thereof by a metal material (powder) with superior electrical conductivity and thermal stability. The photocatalyst is substantially uniformly and rapidly coated, resulting in improved mass productivity. Particularly, since electrical properties are uniformly distributed during the process of generating cold plasma through application of a high voltage, there is an advantage in that the stable generation of the plasma can be secured.

Further, according to an embodiment of the invention, the photocatalyst is coated on the porous filter, and each of some unit cells of the porous filter are plugged at one of both ends thereof by conductive metal and each of unit cells adjacent thereto is plugged at an end of both ends thereof apposite to the plugged end of the above unit cell. Thereafter, both end surfaces of the carrier are coated further with a material identical to the plugging metal and subjected to heat treatment and sintering at high temperature. Thus, integral electrodes capable of exhibiting the same effects as electrodes employed in a photoreaction system are formed. When a high voltage is applied to the carrier, plasma is generated to activate the photocatalyst coated on the unit cells, thereby inducing an oxidation reaction by which oxygen existing in exhaust gas and captured particulate matters are reacted with each other to continuously regenerate the filter. Further, since the filter for capturing the particulate matters and the electrodes for forcibly regenerating the captured particulate matters are integrally formed in the carrier, there is an advantage in that the assembly process is simplified and a processing system also becomes simple.

Furthermore, in a system of an embodiment of the invention, since the plasma is generated within the filter (carrier), there is an advantage in that oxidizing power and ultraviolet rays of the plasma can be directly used so that energy consumption is reduced and the configuration of the system is simplified.

What is claimed is:

1. A method of processing a composition comprising soot particles, the method comprising:
providing a honeycomb apparatus extending between a first end and a second end, the honeycomb apparatus comprising a first chamber and a second chamber, which are extending in substantially parallel between about the first end and about the second end, the first and second chambers being divided by a filter wall therebetween, the first chamber comprising an inlet opening at about the first end and a first electrode plugging into the first chamber at about the second end such that the first electrode is exposed to inside the first chamber, the second chamber comprising an outlet opening at about the second end and a second electrode plugging into the second chamber at about the first end such that the second electrode is exposed to inside the second chamber, wherein a photocatalyst is formed in at least one of the first and second chambers;
supplying a first composition comprising soot particles and at least one gaseous component into the first chamber via the inlet opening;
collecting with the filter wall the soot particles in the first chamber while passing the at least one gaseous component through the filter wall to the second chamber;
activating the photocatalyst and generating at least one oxidant within at least one of the first and second chambers by applying electrical power between the first and second electrodes and creating a plasma condition within the at least one of the first and second chambers;
oxidizing at least part of the soot particles collected in the first chamber with the at least one oxidant; and
discharging from the second chamber a second composition substantially free of soot particles via the outlet opening.

2. The method of claim 1, wherein collecting, activating and oxidizing are substantially simultaneously carried out.

3. The method of claim 1, wherein collecting, activating and oxidizing are substantially sequentially carried out.

4. The method of claim 1, wherein the photocatalyst is formed on a surface of the filter wall.

5. The method of claim 1, wherein the first composition comprises an exhaust gas from combustion of fuel comprising hydrocarbons.

6. The method of claim 1, wherein the soot particles comprises hydrocarbons that may not pass through the filter wall, wherein oxidizing at least part of the soot particles comprises oxidizing some or all of the hydrocarbons, which are broken into smaller molecules that can pass through the filter wall.

7. The method of claim 1, wherein the at least one oxidant comprises at least one of superoxide anion and a hydroxyl radical.

8. The method of claim 1, wherein oxidizing at least part of the soot particles comprises converting at least part of the soot particles to gas.

9. The method of claim 1, wherein the honeycomb apparatus further comprises two or more additional chambers extending in substantially parallel with the first chamber and arranged around the first chamber, wherein the first chamber is separated by each of the two or more additional chambers by another filter wall, wherein each of the two or more additional chambers comprising an outlet opening at about the second end and another second electrode plugging into the each additional chamber at about the first end;
wherein the method further comprises:
collecting with the filter walls the soot particles in the first chamber while passing the at least one gaseous component through the filter wall to the second chamber and the two or more additional chambers around the first chamber, and
discharging from each of the two or more additional chambers a composition substantially free of soot particles via the outlet opening thereof.

10. A method of processing a composition comprising soot, the method comprising:
providing a composition processing apparatus extending between a first end and a second end, the apparatus comprising a first chamber and a second chamber, which are extending in substantially parallel between about the first end and about the second end, the first and second chambers being divided by a filter wall therebetween, the first chamber comprising an inlet opening at about the first end and a first electrode plugging into the first chamber at about the second end such that the first electrode is exposed to inside the first chamber, the second chamber comprising an outlet opening at about the second end and a second electrode plugging into the second chamber at about the first end such that the second electrode is exposed to inside the second chamber;
flowing a first composition comprising soot particles and gaseous components into the first chamber via the inlet opening;
filtering the first composition with the filter wall by passing the gaseous components through the filter wall while inhibiting soot particles from passing, thereby depositing at least part of the soot particles on a surface of the filter wall within the first chamber;
creating a plasma condition near the filter wall by applying electrical power between the first and second electrodes, which generates one or more oxidants;
removing at least part of the soot particles deposited on the surface of the filter wall; and
discharging from the second chamber a second composition substantially free of soot particles via the outlet opening.

11. The method of claim 10, wherein removing at least part of the soot particles comprises oxidizing the at least part of the soot particles with the one or more oxidants and converting the at least part of the soot particles to gas.

12. The method of claim 10, wherein the filter wall is made of a porous ceramic material.

13. The method of claim 10, wherein the apparatus further comprises a catalyst in at least one of the first and second chambers, wherein the catalyst is selected from the group consisting of $TiO_2$, $ZnO$, $CdS$, $ZrO_2$, $SnO_2$, $V_2O_2$, $WO_3$, $SrTiO_3$, and a mixture comprising one or more of the foregoing compounds.

14. The method of claim 10, wherein filtering, creating and removing are substantially simultaneously carried out.

15. The method of claim 10, wherein removing at least part of the soot particles comprises oxidizing the at least part of the soot particles so as to generate resultants that can pass through the filter wall.

16. The method of claim 10, wherein the one or more oxidants are converted from ambient chemical species comprising one or more selected from the group consisting of the at least one gaseous components of the first composition and components of the air.

* * * * *